United States Patent
Tschida et al.

(10) Patent No.: US 11,168,791 B1
(45) Date of Patent: Nov. 9, 2021

(54) BRUSH SEAL MOUNTING FOR A VISE JAW

(71) Applicant: Kurt Manufacturing Company, Inc., Minneapolis, MN (US)

(72) Inventors: Steven John Tschida, Harris, MN (US); Brian Henry Rich, Blaine, MN (US)

(73) Assignee: Kurt Manufacturing Company, Inc., Minneapolis, MN (US)

( * ) Notice: Subject to any disclaimer, the term of this patent is extended or adjusted under 35 U.S.C. 154(b) by 63 days.

(21) Appl. No.: 15/695,595

(22) Filed: Sep. 5, 2017

Related U.S. Application Data

(60) Provisional application No. 62/383,170, filed on Sep. 2, 2016.

(51) Int. Cl.
| | |
|---|---|
| *F16J 15/3288* | (2016.01) |
| *B25B 1/10* | (2006.01) |
| *F16J 15/328* | (2016.01) |
| *B25B 1/22* | (2006.01) |
| *B25B 1/24* | (2006.01) |

(52) U.S. Cl.
CPC ........... *F16J 15/3288* (2013.01); *B25B 1/103* (2013.01); *F05D 2240/56* (2013.01)

(58) Field of Classification Search
CPC .... F16J 15/3288; B25B 1/103; F05D 2240/56
USPC .................................................. 269/43, 156
See application file for complete search history.

(56) References Cited

U.S. PATENT DOCUMENTS

| | | | | |
|---|---|---|---|---|
| 5,098,073 A | * | 3/1992 | Lenz | B25B 1/103 |
| | | | | 269/136 |
| 6,669,203 B1 | * | 12/2003 | Mortzheim | F16J 15/3288 |
| | | | | 277/355 |
| 8,727,354 B2 | * | 5/2014 | Addis | F16J 15/3288 |
| | | | | 277/355 |
| 2003/0131602 A1 | * | 7/2003 | Ingistov | F01D 11/001 |
| | | | | 60/772 |
| 2003/0178778 A1 | * | 9/2003 | Szymbor | F16J 15/3288 |
| | | | | 277/355 |
| 2004/0018085 A1 | * | 1/2004 | Dhar | F16J 15/3288 |
| | | | | 415/174.2 |

(Continued)

OTHER PUBLICATIONS

Amazon, Wave Washer with Overlap, JSPRING, Product Information https://www.amazon.com/Overlap-SSB-0158-31-72MM (Year: 2018).*

(Continued)

*Primary Examiner* — Tyrone V Hall, Jr.
*Assistant Examiner* — Abbie E Quann
(74) *Attorney, Agent, or Firm* — Steven M. Koehler; Westman, Champlin & Koehler, P.A.

(57) ABSTRACT

A jaw nut of a vise has a threaded bore with at least one opening on an end face. The jaw nut includes an inner annular groove concentric with a centerline of the threaded bore. The inner annular groove has a radius larger than a radius of the at least one opening from the centerline so as to provide at least a portion of an annular flange about the at least one opening having an inner annular surface facing in a direction opposite the end face. A threaded screw supported for rotation on the vise body threadably engages the threaded bore of the jaw nut. A brush seal is disposed in the inner annular groove with an outwardly facing annular surface engaging the inner annular surface of the inner annular groove.

16 Claims, 5 Drawing Sheets

(56) References Cited

U.S. PATENT DOCUMENTS

2012/0104700 A1\* 5/2012 Peer ..................... F16J 15/3288
   277/355
2013/0234397 A1\* 9/2013 Uehara ................ F16J 15/3288
   277/353

OTHER PUBLICATIONS

Precision Brush, Stock Inside Disk Brushes, Feb. 6, 2016 https://web.archive.org/web/20150206214317/https://precisionbrush.com/inside-disk-brushes (Year: 2016).\*

\* cited by examiner

BRUSH SEAL MOUNTING FOR A VISE JAW

CROSS-REFERENCE TO RELATED APPLICATION

The present application is based on and claims the benefit of U.S. provisional patent application Ser. No. 62/383,170, filed Sep. 2, 2016, the content of which is hereby incorporated by reference in its entirety.

BACKGROUND

The discussion below is merely provided for general background information and is not intended to be used as an aid in determining the scope of the claimed subject matter.

Aspects of the present invention relate to vises. Vises having a movable jaw may drive the movable jaw by rotating a threaded shaft relative to a jaw nut of the movable jaw. Commonly such jaw nuts include brush seals about apertures at each end of the jaw nut that receives the threaded shaft. The brush seals inhibit metal shavings and/or other contaminants from entering the jaw nut, which can interfere with operation of the threaded coupling of the jaw nut and threaded shaft. The brush seals are disposed in simple annular recesses of the apertures receiving the threaded shaft. Each recess has an opening initially formed with a selected radial distance from a centerline of a threaded bore of the jaw nut. An inner cylindrical surface of each recess has the same radius as that of the corresponding aperture. Each brush seal is disposed in the recess and dimples are provided or formed in the jaw nut proximate the aperture so as to cause deformation of the aperture of the recess. The deformed material of the jaw nut in effect locally reduces the radius where the dimples are made which retains the brush seal in the annular recess. Some disadvantages of the prior art technique include that the brush seal may not actually be retained in the annular recess during manufacturing (or after the customer has received the vise and has used it for a short time) due to process variations of the brush seal. In addition, the technique does not readily allow the brush seal to be replaced when needed.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

One general aspect includes a vise having a vise body. A jaw nut has a threaded bore with at least one opening on an end face. The jaw nut includes an inner annular groove concentric with a centerline of the threaded bore. The inner annular groove has a radius larger than a radius of the at least one opening from the centerline so as to provide at least a portion of an annular flange about the at least one opening having an inner annular surface facing in a direction opposite the end face. A threaded screw supported for rotation on the vise body threadably engages the threaded bore of the jaw nut. A brush seal is disposed in the inner annular groove with an outwardly facing annular surface engaging the inner annular surface of the inner annular groove.

DETAILED DESCRIPTION OF ILLUSTRATIVE EMBODIMENTS

Figure 1:
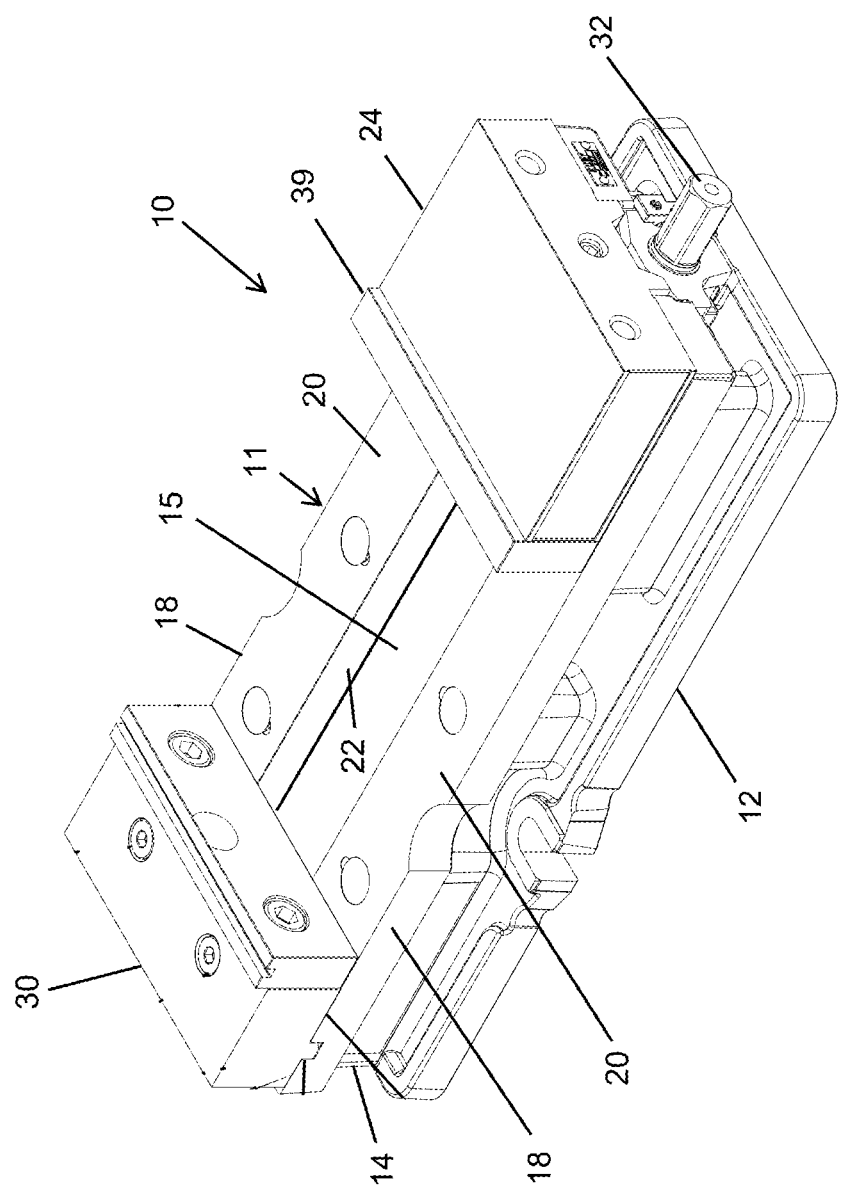
FIG. 1 is a perspective view of a vise.

An exemplary vise 10 having aspects of the present invention includes a vise body 11 that extends longitudinally along a central axis. The vise body, 11, includes a base plate or wall 12 and upstanding side rails 14 on opposite sides thereof.

The upstanding rails 14 have upper flanges 18 on opposite sides of the central axis with co-planar upper surfaces 20 on top of the upper flanges 18 and inwardly facing side rail surfaces 22 that are spaced apart. The surfaces 22 define a jaw guide space and extend along the length of the vise body 11. The surfaces 22 guide a floating vise jaw assembly indicated generally at 24. The rails 14 are spaced to form a longitudinally extending recess 15.

A portion of the vise jaw assembly 24 moves in the recess 15 as guided by the surfaces 22 of the side rails 14 toward and away from a stationary jaw 30 with a suitable drive actuator, herein comprising a vise screw 32 having a handle, now shown. The vise jaw assembly 24 threadably mates with the vise screw 32 where rotation of the vise screw 32 moves the vise jaw assembly 24 toward or away from the stationary jaw 30.

Figure 2:
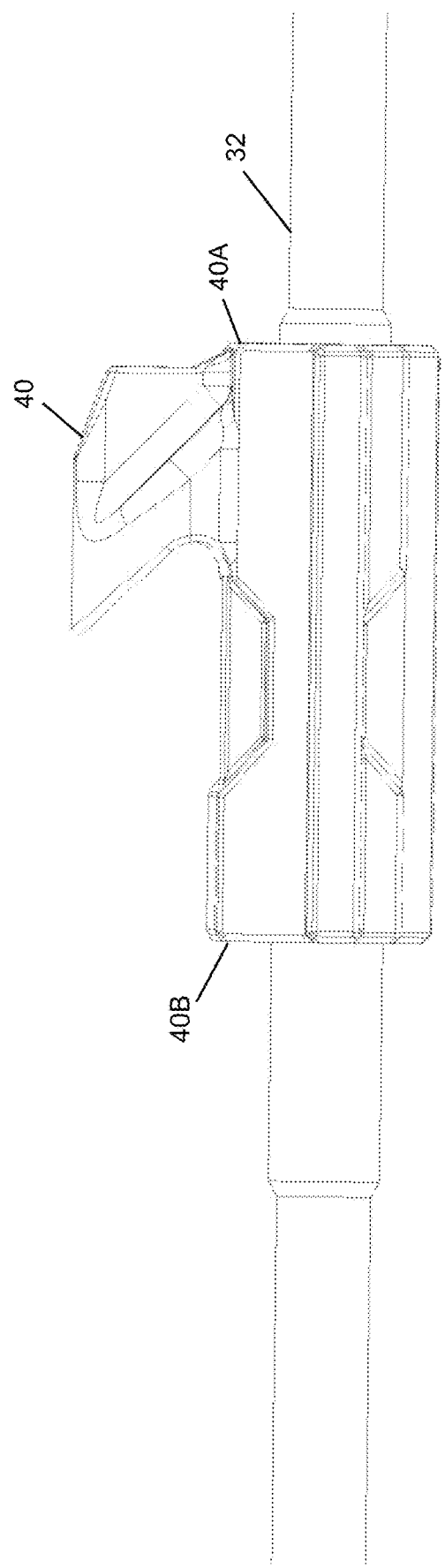
FIG. 2 is an elevational view of a jaw nut.
Figure 4:
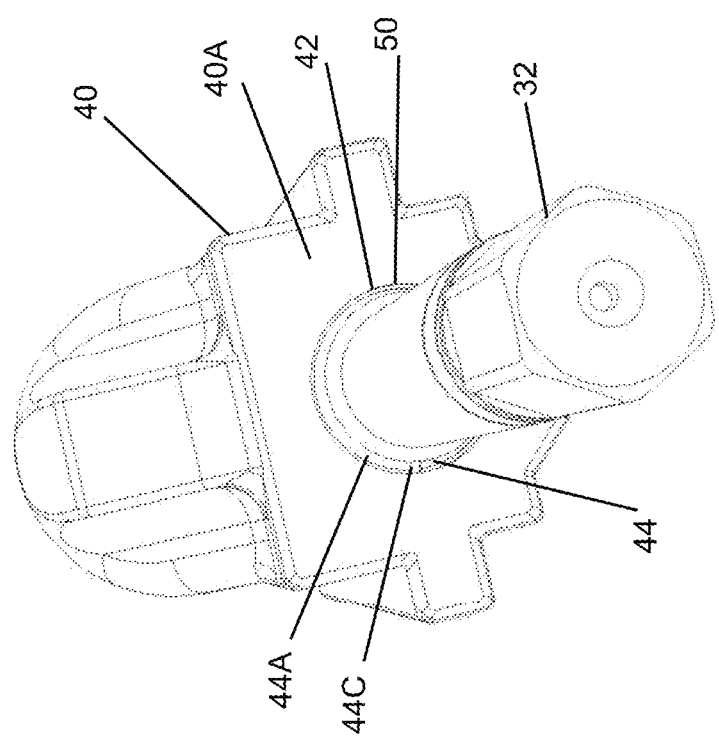
FIG. 4 is a perspective view of a jaw nut and threaded shaft of the present disclosure.
Figure 5:
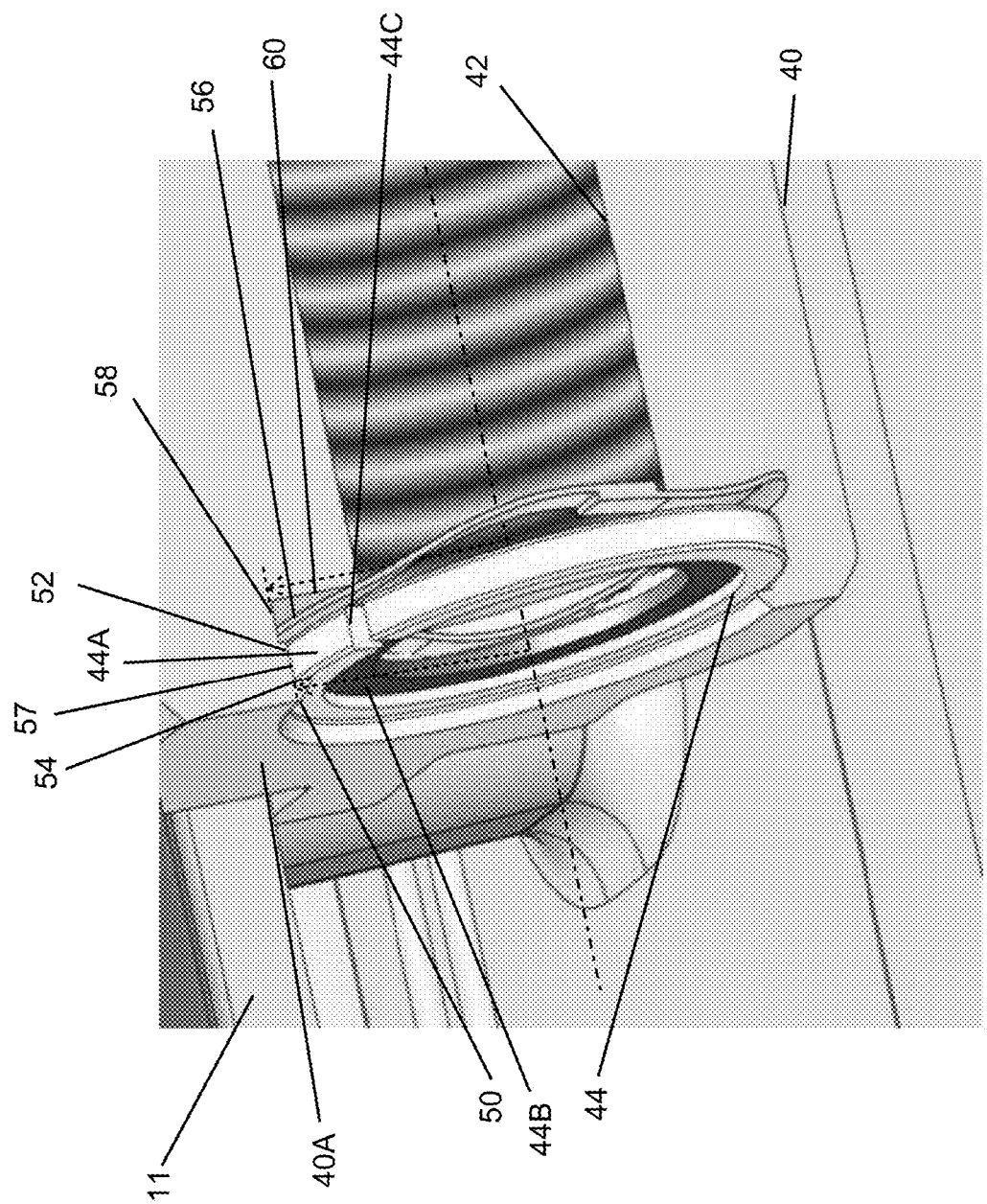
FIG. 5 is a partial view of a brush seal and spring in a jaw nut with a portion removed.

Referring to FIGS. 2, 4 and 5, the moveable vise jaw assembly 24 includes a jaw nut 40 that is threadably engaged with screw 32 such that upon rotation of screw 32 the jaw nut 40 moves axially with respect to screw 32. In order to inhibit metal chips or other forms of debris from entering a threaded bore 42 of jaw nut 40, a brush seal 44 having a plurality of inwardly directed brush elements or bristles is commonly mounted at each end 40A, 40B.

Figure 3:
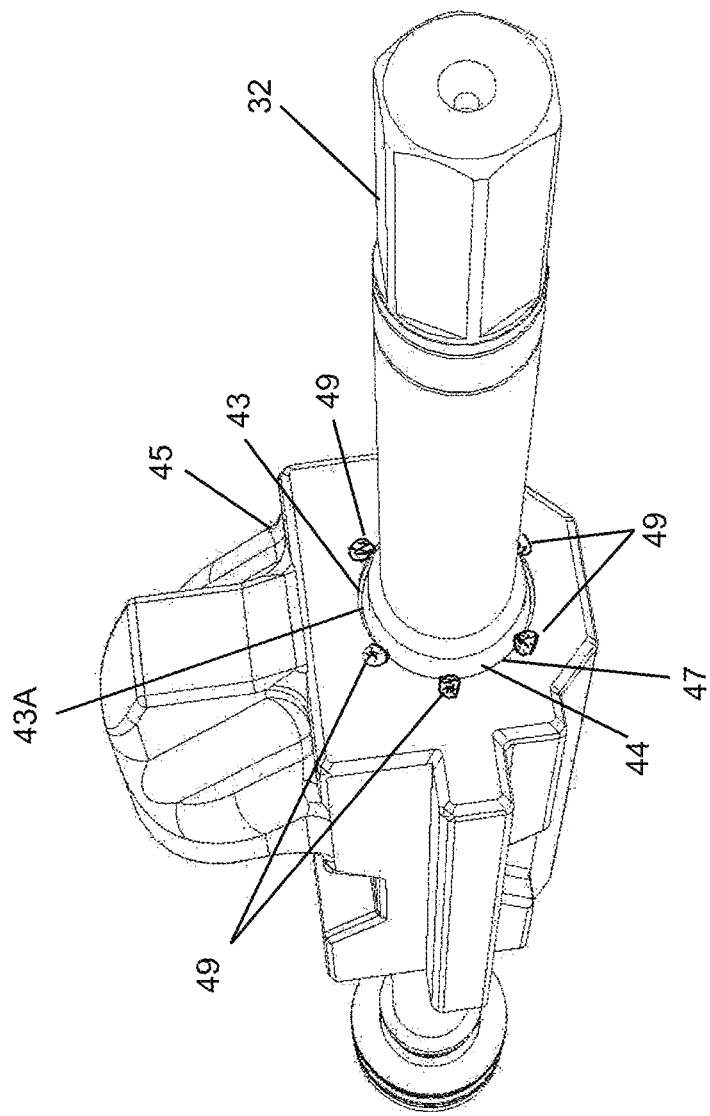
FIG. 3 is a perspective view of a prior art jaw nut and threaded shaft.

In prior art jaw nuts such as illustrated in FIG. 3 at 45, the brush seal 44 is disposed in a simple annular recess 43 on each end of the jaw nut 45. The recess 43 has an opening 43A initially formed with a selected radial distance from a centerline of a threaded bore 47. An inner cylindrical surface of the recess 43 has the same radius as that of the opening 43A. The brush seal 44 is disposed in the recess 43 and dimples 49 are provided or formed in the jaw nut 45 proximate the opening 43A so as to cause deformation of the opening 43A of the recess 43. The deformed material of the jaw nut 45 in effect locally reduces the radius where the dimples 49 are made which retains the brush seal 44 in the annular recess 43. As mentioned in the Background section some disadvantages of the prior art technique include the brush seal 44 may not actually be retained in the annular recess 43 during manufacturing (or after the customer has received the vise and has used it for a short time) due to process variations of the brush seal 44. In addition, the technique does not readily allow the brush seal 44 to be replaced when needed.

An improved technique and assembly for mounting the brush seal 44 in the jaw nut 40 is illustrated in FIGS. 4 and 5. The threaded bore 42 of the jaw nut 40 has a flange(s) 54 about an opening 50 on each end face 40A, 40B having at least spaced apart portions (herein illustrated as a continuous annular flange that circumscribes the perimeter of the opening 50) with a first radius from a centerline of the threaded bore 42 that is less than a radius of an annular rim 44A of the brush seal 44 when the brush seal 44 is mounted in the jaw nut 40. In the embodiment illustrated, end face 40A is illustrated in FIGS. 4 and 5, but end face 40B would have a similar construction.

Although illustrated where the flange(s) 54 or spaced apart portions of flanges can be formed integral from a single unitary body as the material of the jaw nut 40 or material of the jaw nut 40 about the opening 50, this is but one embodiment in that if desired the flange(s) 54 can be made as a separate component that is attached to the jaw nut 40 by any conventional manner such as but not limited to welding, brazing, adhesive, friction and/or various forms of fasteners.

It should be noted that the annular rim 44A holds brush elements or bristles 44B in position; however, the annular rim 44A has a slot or gap 44C, which allows the annular rim 44A to be slightly compressed and/or slightly twisted to allow insertion the opening 50. The jaw nut 40 also includes an inner annular groove 52 having a radius that is larger than the radius of the opening 50 on each end face 40A, 40B so as to provide the flange 54 (which again can be non-continuous spaced apart flanges) that has one or more surfaces (e.g. annular surface) facing inwardly away from the corresponding end face 40A, 40B of the jaw nut 40. The radius of the inner groove 52 is selected so as to be slightly smaller than a radius of annular rim 44A of the brush seal 44 in a relaxed state such that when the brush seal 44 is disposed in the inner groove 52, the annular rim 44A of the brush seal is slightly compressed in effect reducing the gap 44C and creating friction between the annular rim 44A and the annular wall of the inner groove 52.

The inner groove 52 also has an axial length or depth to accommodate the brush seal 44 and preferably includes at least one spring device 56. For purposes of understanding, continuous axial portions of the inner groove 52 are identified at 57 (first axial portion) and 58 (second axial portion), where one portion holds or lands the brush seal 44 and the other portion holds or lands the at least one spring device 56. In a preferred embodiment, the brush seal 44 is disposed or landed in first axial portion 57. The at least one spring device 56 is disposed or landed in the second axial portion 58 of the inner groove 52 between the brush seal 44 and an inner back annular wall or surface 60 of the inner groove 52. In the embodiment illustrated, the spring device 56 is configured so as to provide an axial force against the annular rim 44A in a direction out of the opening 50 of the jaw nut 40 so that the annular rim 44A is held against annular flange 54. The spring device 56 can take many known forms, such as but not limited to, a wave spring, herein illustrated, a bellevue washer, a lock washer, a coiled spring, compressible rubber, foam, elastic and/or other material, etc. preferably in a tubular shape, but like the annular rim 44A need not be completely tubular. In an alternative embodiment, the brush seal 44 can be disposed or landed in the second axial portion 58 with the spring device 56 disposed or landed in the first axial portion 57. Although the spring 56 and brush seal 44 can be interchanged in the inner groove 52 it may be preferable to have the brush seal 44 to be the outermost element so as to bear against the flange 54 and inhibit contaminants from entering the groove 52, particularly when the spring is of the nature of a wave spring.

The diameters of the axial portions 57 and 58 can be the same or different. In the embodiment illustrated, the second axial portion 58 of the inner groove 52 for the spring device 56 has a radius from the centerline of the bore 42 that is greater than the first axial portion 57 that is for the brush seal 44. It should be noted that this is not necessary in all embodiments, but may be beneficial to accommodate standard sizes of brush seals 44 and spring devices 56 made by such manufacturers without the need for obtaining a custom size of either the brush seal 44 or spring device 56. In other embodiments, the axial portion for the spring device 56 could have a radius from the centerline of the bore 42 that is less than the axial portion that is for the brush seal 44, or has the same radius from the centerline of the bore 42 as the axial portion for the brush seal 44.

Assembly of the brush seal 44 in the jaw nut 40 in the illustrative embodiment involves first locating the spring device 56 and brush seal 54 in the inner groove 52, which is typically done before the vise screw 32 has been threadably mated with the jaw nut 40. Although, the spring device 56 has an outer diameter greater than the opening 50 in the associated end face 40A, 40B, the spring devices 56 are made of a compliant material that allows it to be deformed slightly allowing insertion through the opening 50 where it can then return to a more relaxed state, for example, expanding slightly and/or returning to a generally circular shape when positioned in the inner groove 52. The brush seal 44 can then be inserted through the opening 50. The gap 44C provided in the annular rim 44A allows the annular rim 44A to be slightly compressed and/or deformed as it is inserted through the opening 50 and if needed, a portion of the brush seal 44 can be pushed against the spring device 56 such that the inserted portion is spaced apart from the inner annular flange 54 so as to allow the remainder of the brush seal 44 to be inserted through the opening 50 in the associated end face 40A, 40B.

The new mounting assembly and technique avoids the need for deforming the material of the jaw nut 40 proximate the opening 50 thus approving its appearance and ensuring that the brush seal 44 is retained in the jaw nut 40. Likewise, when necessary, the brush seal 44 can be replaced by removing it in a manner opposite to its installation.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A vise comprising:
   a vise body;
   a jaw nut having a threaded bore with an opening on an end face, the jaw nut having an inner annular groove concentric with a centerline of the threaded bore, the inner annular groove having a radius larger than a radius of the opening from the centerline so as to provide at least a portion of an annular flange about the centerline forming the opening and having an inner annular surface facing in a direction opposite the end face, wherein the at least a portion of the annular flange is integral being formed from a single unitary body with material of the jaw nut forming the opening, and wherein the inner annular groove is separate from threads of the threaded bore, the inner annular groove being disposed axially on the centerline between the end face and a beginning of the threads of the threaded bore;

a threaded screw supported for rotation on the vise body and threadably engaging the threaded bore of the jaw nut; and an assembly mounted in the inner annular groove, the assembly consisting essentially of:

a brush seal disposed in the inner annular groove with an outwardly facing annular surface engaging the inner annular surface of the inner annular groove and bristles of the brush seal extending radially with respect to the centerline; and a spring disposed in the inner annular groove and configured to retain the brush seal against the inner annular surface of the inner annular groove with a spring force in a direction parallel to the centerline of the threaded bore.

2. The vise of claim 1 wherein the inner annular groove includes a first axial portion configured to retain the brush seal and a second axial portion configured to retain the spring, wherein a radius of an inner cylindrical surface of the first axial portion from the centerline is different than a radius of an inner cylindrical surface of the second axial portion from the centerline.

3. The vise of claim 1 wherein the spring is annular.

4. The vise of claim 1 and wherein the spring is disposed in the inner annular groove axially between the brush seal and a back annular surface of the jaw nut.

5. The vise of claim 4 wherein the spring is annular.

6. The vise of claim 1 wherein the spring comprises a wave spring.

7. The vise of claim 1 wherein the spring is made of metal, plastic, foam or elastic material.

8. The vise of claim 1 wherein the annular flange circumscribes a perimeter of the opening.

9. A vise comprising:

a vise body;

a jaw nut having a threaded bore with an opening on an end face, the jaw nut having an inner annular groove concentric with a centerline of the threaded bore, the inner annular groove having a radius larger than a radius of the opening from the centerline so as to provide at least a portion of an annular flange about the centerline having an inner annular surface facing in a direction opposite the end face, wherein the at least a portion of the annular flange is integral being formed from a single unitary body with material of the jaw nut forming the opening, and wherein the inner annular groove is separate from threads of the threaded bore, the inner annular groove being disposed axially on the centerline between the end face and a beginning of the threads of the threaded bore;

a threaded screw supported for rotation on the vise body and threadably engaging the threaded bore of the jaw nut; and an assembly mounted in the inner annular groove, the assembly consisting essentially of:

a brush seal disposed in the inner annular groove with an outwardly facing annular surface of an annular rim engaging the inner annular surface of the inner annular groove, and wherein the annular rim only partially circumscribes the centerline such that a gap is present between end surfaces of the annular rim that face each other when the brush seal is disposed in the inner annular groove and bristles of the brush seal extend radially with respect to the centerline; and a spring disposed in the inner annular groove and configured to retain the brush seal against the inner annular surface of the inner annular groove with a spring force directed parallel to the centerline of the threaded bore and out of the opening on the end face.

10. The vise of claim 9 wherein the inner annular groove includes a first axial portion configured to retain the brush seal and a second axial portion configured to retain the spring, wherein a radius of an inner cylindrical surface of the first axial portion from the centerline is different than a radius of an inner cylindrical surface of the second axial portion from the centerline.

11. The vise of claim 9 wherein the spring is annular.

12. The vise of claim 9 and wherein the spring is disposed in the inner annular groove axially between the brush seal and a back annular surface of the jaw nut.

13. The vise of claim 12 wherein the spring is annular.

14. The vise of claim 9 wherein the spring comprises a wave spring.

15. The vise of claim 9 wherein the spring is made of metal, plastic, foam or elastic material.

16. The vise of claim 9 wherein the annular flange circumscribes a perimeter of the opening.

* * * * *